(12) United States Patent
Staudenrausch (10) Patent No.: US 10,921,173 B2
(45) Date of Patent: Feb. 16, 2021

(54) FILLING MACHINE AND METHOD FOR THE FILLING LEVEL MEASUREMENT, IN PARTICULAR FOR THE SAUSAGE PRODUCTION

(71) Applicant: Albert Handtmann Maschinenfabrik GmbH & Co. KG, Biberach (DE)

(72) Inventor: Martin Staudenrausch, Biberach (DE)

(73) Assignee: ALBERT HANDTMANN MASCHINENFABRIK GMBH & CO. KG, Biberach (DE)

( * ) Notice: Subject to any disclaimer, the term of this patent is extended or adjusted under 35 U.S.C. 154(b) by 340 days.

(21) Appl. No.: 15/278,893

(22) Filed: Sep. 28, 2016

(65) Prior Publication Data

US 2017/0088295 A1    Mar. 30, 2017

(30) Foreign Application Priority Data

Sep. 29, 2015 (EP) .................................... 15187282

(51) Int. Cl.
| | | |
|---|---|---|
| *G01F 23/284* | (2006.01) | |
| *A22C 11/02* | (2006.01) | |
| *B65B 1/16* | (2006.01) | |
| *B65B 1/48* | (2006.01) | |
| *B65B 39/00* | (2006.01) | |

(52) U.S. Cl.
CPC ........ *G01F 23/284* (2013.01); *A22C 11/0245* (2013.01); *B65B 1/16* (2013.01); *B65B 1/48* (2013.01); *B65B 39/007* (2013.01)

(58) Field of Classification Search
CPC ......... G01F 23/284–2845; G01F 23/00; A22C 11/0245; B65B 1/48; B65B 39/007; B65B 1/16
See application file for complete search history.

(56) References Cited

U.S. PATENT DOCUMENTS

| | | | | |
|---|---|---|---|---|
| 4,670,754 A | * | 6/1987 | Zacchio | G01F 23/284 342/124 |
| 5,115,218 A | * | 5/1992 | Jean | H01P 1/08 333/252 |
| 5,364,251 A | * | 11/1994 | Simonsen | F04C 3/04 418/220 |
| 5,587,969 A | * | 12/1996 | Kroemer | G01F 23/296 367/908 |
| 5,594,449 A | * | 1/1997 | Otto | G01F 23/284 340/612 |
| 5,770,990 A | * | 6/1998 | Lubbers | G01F 23/284 333/252 |

(Continued)

FOREIGN PATENT DOCUMENTS

| | | |
|---|---|---|
| CN | 1264033 A | 8/2000 |
| EP | 1431724 A1 | 6/2004 |

(Continued)

*Primary Examiner* — Matthew M Barker
(74) *Attorney, Agent, or Firm* — McCoy Russell LLP (57) ABSTRACT

The present disclosure relates to a filling machine and a method for filling of filling medium, in particular for the production of sausages with a hopper for accommodating filling medium, a conveyor for supplying the filling medium and a filling element, in particular a filling tube, as well as a device for measuring the filling level in the hopper. The device for measuring the filling level comprises a radar sensor.

23 Claims, 7 Drawing Sheets

(56) References Cited

U.S. PATENT DOCUMENTS

| | | | |
|---|---|---|---|
| 6,276,199 B1* | 8/2001 | Eckert | G01F 23/284 343/872 |
| 6,634,234 B1* | 10/2003 | Haas | G01F 23/284 367/138 |
| 6,759,976 B1* | 7/2004 | Edvardsson | G01F 23/284 342/124 |
| 6,986,294 B2* | 1/2006 | Fromme | G01B 11/24 73/865.8 |
| 7,075,480 B2* | 7/2006 | Fehrenbach | G01F 23/284 342/124 |
| 7,173,436 B2* | 2/2007 | Edvardsson | G01F 23/284 324/644 |
| 7,381,122 B2* | 6/2008 | Lagares Corominas | A22C 11/00 452/30 |
| 7,552,634 B2* | 6/2009 | Huber | G01F 23/003 73/290 V |
| 7,770,858 B2* | 8/2010 | Fehrenbach | F16M 11/10 248/284.1 |
| 8,931,339 B2* | 1/2015 | Muller | G01F 23/0076 73/290 R |
| 2004/0119635 A1 | 6/2004 | Edvardsson | |
| 2007/0254570 A1* | 11/2007 | Maile | A22C 11/02 452/30 |
| 2010/0101317 A1* | 4/2010 | Ashrafzadeh | G01F 23/0061 73/149 |
| 2012/0281096 A1* | 11/2012 | Gellaboina | G01F 23/292 348/163 |
| 2013/0228011 A1* | 9/2013 | Pohl | H01P 1/08 73/290 V |
| 2014/0047917 A1* | 2/2014 | Vogt | G01F 23/284 73/290 V |
| 2014/0174172 A1* | 6/2014 | Hagg | G01F 23/284 73/290 V |
| 2014/0238536 A1* | 8/2014 | Kumakura | B65B 1/12 141/67 |
| 2016/0054167 A1* | 2/2016 | Welle | G01F 23/284 342/124 |
| 2017/0284854 A1* | 10/2017 | Skowaisa | G01S 7/4026 |

FOREIGN PATENT DOCUMENTS

| | | |
|---|---|---|
| EP | 1836896 A1 | 9/2007 |
| EP | 2128576 A1 | 12/2009 |

* cited by examiner

FILLING MACHINE AND METHOD FOR THE FILLING LEVEL MEASUREMENT, IN PARTICULAR FOR THE SAUSAGE PRODUCTION

CROSS REFERENCE TO RELATED APPLICATIONS

The present application claims priority to European Patent Application No. 15 187 282.7, entitled "FILLING MACHINE AND METHOD FOR THE FILLING LEVEL MEASUREMENT, IN PARTICULAR FOR THE SAUSAGE PRODUCTION," filed Sep. 29, 2015, the entire contents of which are hereby incorporated by reference for all purposes.

TECHNICAL FIELD

The present disclosure relates to a filling machine for filling of filling medium as well as to a method for determining the filling level, in particular for sausage production.

BACKGROUND AND SUMMARY

Filling machines for filling pasty filling medium are known from the state of the art particularly for the production of sausages. With such filling machines, pasty filling medium is introduced from a hopper into a conveyer and from there ejected into a filling element, in particular a filling tube in order to e.g. fill sausage sleeves or containers with pasty mass.

For the continuous filling level detection in vacuum filling and high vacuum filling machines, currently most of the times ultrasonic sensors or laser "time of flight" sensors are used. The filling level detection is needed for the continuous or intermittent supply of the filling machine with filling mass. The current measurement methods, however, involve essential problems.

As for example a laser "time of flight" sensor works with an optical measurement principle, measurement errors occur due to condensate and droplet formation at the sensor, e.g. if hot masses are in the filling hoppers.

In case of transparent and/or clear filling masses (e.g. clear soup stocks), the filling level may not be measured or only inaccurately, as the laser beam penetrates the filling media and is only reflected at the hopper wall.

Regarding the high vacuum filling machines, the hopper is exhausted above the filling mass. This leads also at low temperatures of the masses to be filled to steam and mist formation that in turn leads to measurement errors.

Also the foam formation on the surface of the filling mass leads to wrong measurement results.

An ultrasonic sensor for functional reasons needs a carrier medium in order to be able to measure the time of the sound waves. In case of the vacuum filling machine with an open hopper, this is the air above the filling machine. At certain vacuums, these sensors do not work anymore due to the lacking carrier medium and therefore, are not suitable for high vacuum machines.

Thus, the objective technical problem underlying the present disclosure is to provide a filling machine and a method allowing to detect the filling level in the hopper of the filling machine in a simple and reliable manner, in particular also of high vacuum filling machines.

According to the present disclosure, a filling machine for filling pasty filling medium, in particular for the sausage production comprises a hopper for accommodating the filling medium, a conveyer for conveying the filling medium to a filling element, in particular a filling tube. The filling machine is particularly adapted for producing sausages, whereby the sausage sleeves are filled via a filling tube with pasty mass, e.g. sausage meat. The filling machine, however, is also suitable for other liquid or pasty food, which may be filled in containers, e.g. hot masses like cheese, soups, etc.

The filling machine further comprises a device for measuring the filling level in the hopper. According to the present disclosure, the device for measuring the filling level comprises a radar sensor.

By means of the radar sensor, the filling level in the hopper can be continuously and contactlessly determined in a simple and reliable manner. The use of a radar sensor is equally suitable for open filling hoppers as well as for closed hoppers.

The radar sensor sends electromagnetic waves. These are reflected at the surface of the filling medium located in the hopper and are again received from the radar sensor. For this, in the radar sensor, a corresponding antenna system is provided, which radiates relevant electromagnetic waves and can again receive the same. Thereby, the time of the electromagnetic waves and, thus, the distance to the filling medium is measured.

This measurement method is resistant towards water droplets, condensate formation, mist formation, as well as contamination of the sensor and can also detect the surface of crystal clear filling media. This method also works particularly well in case of vacuum in the hopper.

The hopper tapers at least in sections conically downwards, i.e. to the direction of the outlet and/or the conveyer. In one example, the radar sensor is arranged in a range above the top edge of the hopper. Thus, it is possible that the radar sensor will be arranged in a way that it is able to detect the filling level over the entire height of the hopper. Thereby, the sensor itself remains in a protective position.

The hopper may comprise a cover, which particularly is the case for high vacuum filling machines, whereby the radar sensor is arranged in a range within the cover. Thus, the sensor is fixedly incorporated in the filling machine and in a protective position, especially also for the reason that the cover may have a bottom sealing the cover interior from the hopper interior. The cover interior is sealed because as a matter of principle, it is unhygienic and has at least one drive, e.g. for a conveyer system or an inlet valve. As the cover bottom is e.g. formed of metal, the radar sensor may be arranged at an opening on the cover bottom. Alternatively thereto, the cover bottom could also be made of a material being permeable for the produced electromagnetic waves, as e.g. plastic, in particular POM, PC, PE, etc.

As the cover may be opened, the sensor is easily accessible for maintenance work and can also easily be upgraded into existing systems.

In one example, the radar sensor is arranged such that its longitudinal axis A either is arranged perpendicular to a horizontal plane or is inclined about <90°–30°, and in one example, about <90°–40° towards a horizontal plane, whereby the surface of the filling medium lies in this horizontal plane or runs parallel thereto. An inclined position of the radar sensor and, thus, of the antenna axis allows that the electromagnetic waves even with an eccentric arrangement of the radar sensor and with conically tapering hopper with high power density reach up to the lower range of the hopper and undesired reflections at the container wall can be reduced. The radar sensor may be eccentrically arranged, as along the middle axis often conveyer systems, as e.g. screw conveyers, etc. and/or fastening elements for conveyer systems are located. Such an inclined position of the sensor may be in some examples for open hoppers (i.e. hoppers with open hopper top side), as the sensor here needs to be arranged relatively far outwards with regard to the middle axis of the hopper, as the sausage meat carrier during dumping the filling medium protrudes up to the mid-range of the hopper and would, thus, interfere with the measurement.

In one example, the electromagnetic waves sent by the radar sensor hit the hopper wall and/or the hopper bottom in the lower area of the filling hopper so that also low filling levels can be detected.

The radar sensor may be connected with the analysis unit, which is configured such that during the time of the electromagnetic waves sent by the radar sensor and reflected by the surface of the filling medium to the radar sensor, the filling level within the hopper can be determined. The time thereby is proportional to the filling level, whereby the filling level can be calculated by means of simple geometric calculation upon known hopper geometry.

In one example, the analysis unit can fade out reflection signals from the hopper wall and/or from components of the hopper, especially movable parts, as e.g. feeder curve and/or screw conveyer. This means that due to a corresponding signal processing, the reflections within and at the container can be analyzed and the filling level signal can be reliably detected.

The filling machine can either be a vacuum filling machine or a high vacuum filling machine. Vacuum filling machines are understood to be e.g. filling machines with a hopper open at the top and/or regarding which the hopper is not specifically exhausted. The conveyer is exhausted and thus, the filling mass is soaked into the conveyer, e.g. via a vane pump, whereby further, air is withdrawn from the filling medium.

The high vacuum filler is understood to be a filling machine with a hopper closed at the top so that the hopper can be exhausted above the filling mass. The conveyer is as well exhausted. In order to fill the compartments within the conveyer sufficiently, there must be generated a higher vacuum in the conveyer than in the hopper above. The present disclosure in particular allows also a reliable filling level determination regarding high vacuum fillers, although the hopper interior is exhausted.

As already explained, according to one embodiment, a fading out of reflection signals of fixed and/or movable parts can occur.

Thereby, the analysis unit, e.g. by means of the signal level or the time of the signal, can recognize that this is a reflection of electromagnetic waves for example at the container wall and/or mounting parts, as e.g. feeder curve and/or screw conveyer. Therefore, for example, the container geometry may be entered into the analysis unit, whereby e.g. also in advance reflection signals of fixed and/or movable parts of the hopper can be empirically determined, which then can be faded out. It is e.g. also possible that it is determined, when a movable part, in particular a feeder curve and/or screw conveyer, is for example located in the main beam lobe of the radar sensor, whereby within a corresponding time, the measurement values are faded out or a measurement does not take place.

In one example, the radar sensor is sealed by a sealing element from the hopper interior. This implies the advantage that the radar sensor itself is not contaminated by the pasty filling mass. Moreover, due to a corresponding sealing element, the strict hygienic food conditions are fulfilled, as the radar sensor cannot come into contact with food. The sealing element, thereby, is in particular permeable in sections at least for the electric radiation. It is, for example, possible that the radar sensor is arranged at the cover bottom of the hopper and that the cover is configured as a sealing element. If the cover is made of a material, which is not permeable for the electromagnetic radiation, an opening within the cover bottom is arranged and the radar sensor is provided at this opening. In one example, this opening is then sealed by means of a sealing element, in particular by means of a slice, which is permeable for the electromagnetic radiation.

A protective tube may connect the radar sensor, in particular the opening in the cover bottom. This protective tube may be made of a material, which is not permeable for the electromagnetic radiation. The protective tube has the functionality to protect the sealing element and the sensor against contamination. Furthermore, the protective tube may also have a directive gain. Regarding the radar filling level measurement, a small angle of radiation, i.e. a good focusing, may be sought in order to minimize an interfering reflection due to tank walls or due to installations. A characteristic factor for the description of the directivity, is the angle of radiation and/or the half width. This term describes the taper angle, at the edge of which the power density lies 3 dB below the maximum power density (i.e. at the edge of this lobe, the power density is half as large as in the center). For example due to the opening in the cover bottom and/or due to the optionally provided protective tube, a good focusing of the electromagnetic waves arises. In one example, this tube may be beveled, whereby the inclined opening surface may be on the leeward side of the feed opening of the filling mass. This involves the advantage that the accumulation of filling charge at the sensor is further prevented. An inclined opening, the surface of which runs for example at an angle of <90° to the longitudinal axis of the tube, and in one example, at an angle of 30-60°, leads to an improvement in the analysis, as then, the echo signal at the tube end shows a smooth transition, while with a straight cut tube, a signal step change is generated.

It is also possible that the radar sensor is connected to a rod or a rope, which can protrude into the hopper and thus, into the filling medium, whereby the spread of the waves may occur. Thus, the spread of the waves here does not occur contactless through the tank atmosphere, but along an electric line. The rod or the rope thereby extend e.g. at least sealed from an opening in the cover bottom into the interior of the hopper. The rod or the rope may also further extend in sections within the cover. The present disclosure is subsequently described with reference to the following figures.

DETAILED DESCRIPTION

Figure 1:
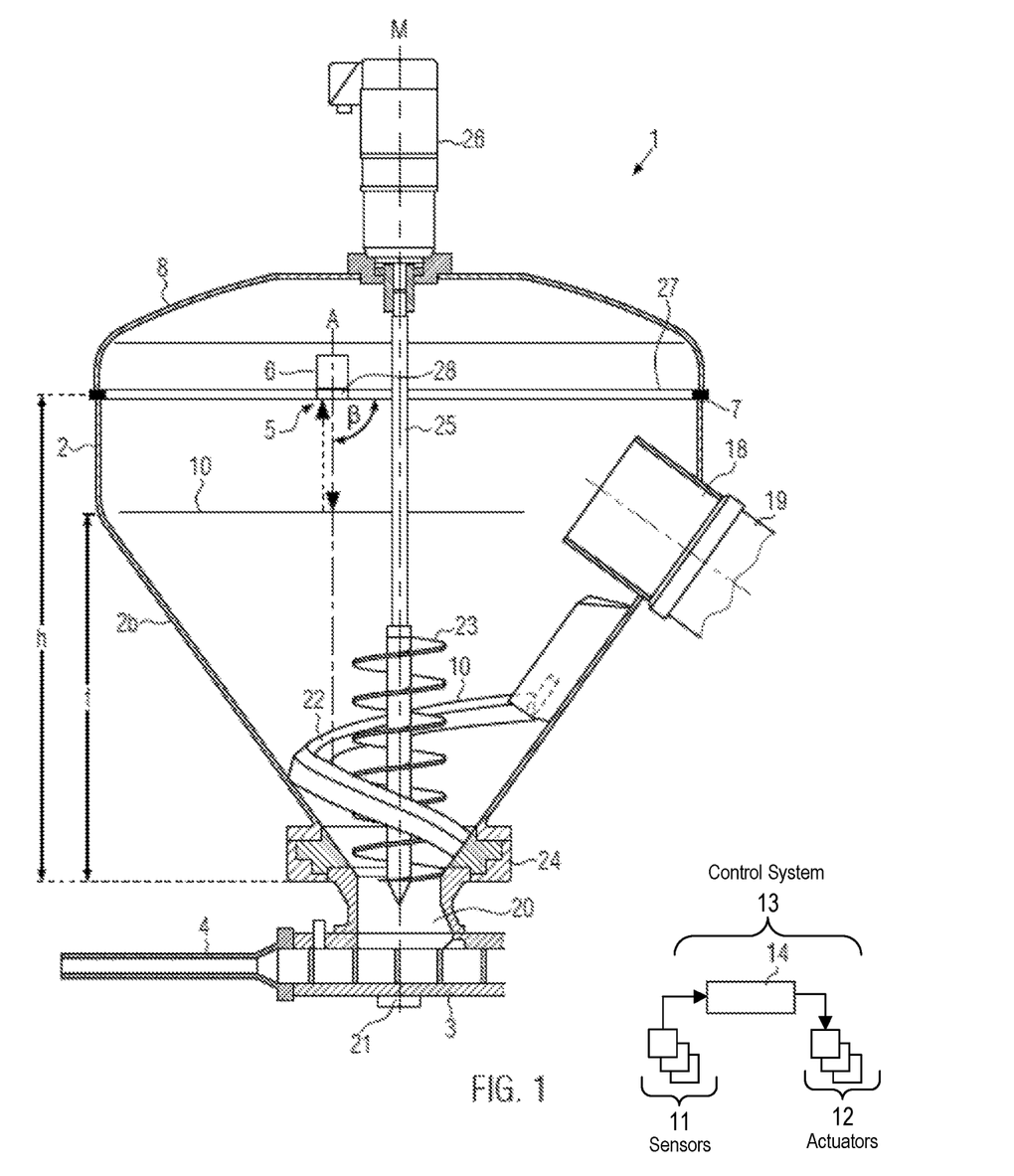
FIG. 1 coarsely shows a schematic longitudinal section through a part of a filling machine according to a first embodiment of the present disclosure.

FIG. 1 shows an embodiment of a part of a filling machine according to the present disclosure, whereby here for the sake of simplicity, there is not shown a machine housing, but only the essential components. The filling machine 1 according to the present disclosure comprises a hopper 2. The present filling machine is for example configured as a vacuum filling machine or a high vacuum filling machine. The filling machine here comprises a cover 8 as well as at least one partially conically tapering part 2b. The cover 8 and the hopper 2 are vacuum-tight connected to one another via a sealing. In the hopper 2 here for example a vacuum can be generated. The hopper comprises an inlet 18 for feeding a filling medium, e.g. a pasty mass, as e.g. sausage meat from a not shown storage tank via the feeding pipe 19. The hopper 2 further comprises at the lower end, i.e. at end opposing the cover 8, an outlet area 20 for the filling medium. At the outlet area 20, a conveyer 3 is arranged for the filling medium, which supplies the filling medium from the hopper 2 into a filling element, here a filling tube 4. A vacuum pump 21, which is only schematically shown, serves for generating a vacuum in the conveyer and/or in the conveyer compartments, and, if appropriate via a separate vacuum connection, in the hopper. Via the filling tube 4 then in a known manner, the filling medium, as for example the sausage meat, is ejected into sausage sleeves intended for this purpose.

In order to supply the filling medium from the hopper 2 into the conveyer 3, a corresponding feeding device 22, 23 is provided. Here, the feeding device comprises for example a combination of a feeder curve 22 and a screw conveyer 23, which is arranged within the feeder curve. Here, the spiral feeder curve 22 is configured as a screw being open inside having a wall scraper. It runs about a feeder curve axis, which may correspond to the middle axis M of the vacuum hopper 2. The feeder curve is pivoted in the bearing 24 and is there driven via a corresponding drive, which is here (not visible) for example arranged behind the bearing 24. The screw 23 is driven via a shaft 25 via a corresponding motor 26. In this embodiment, the motor 26 is located outside the cover 8.

Figure 3:
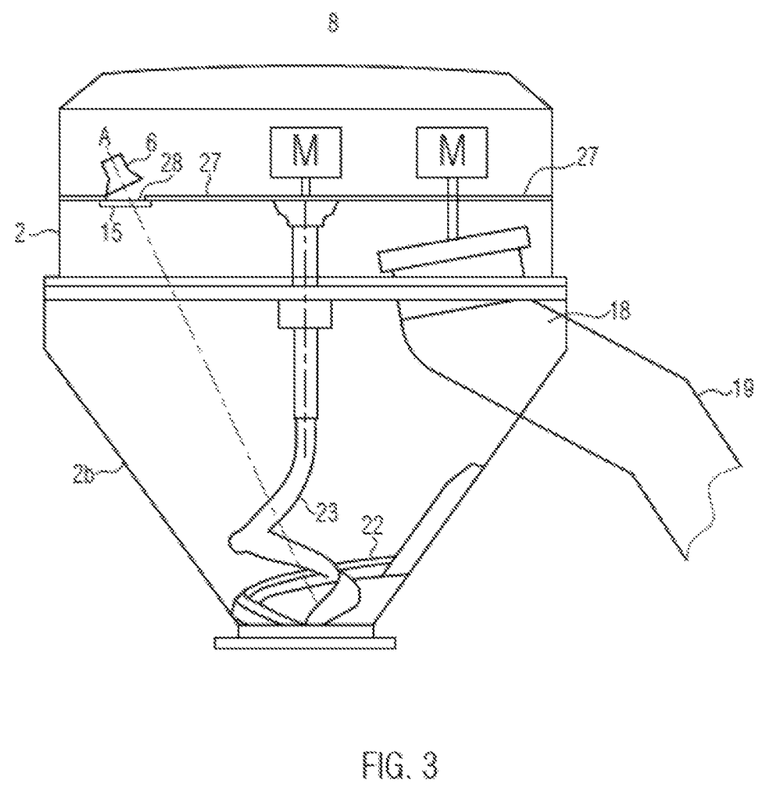
FIG. 3 coarsely shows a further schematic embodiment of a part of a filling machine according to the present disclosure.

As shown in FIG. 3, however, it is also possible that the drive motor 26 for the screw is provided in the interior of the cover 8, which is separated via a cover bottom 27 and, in some examples, pressure-tight, from the interior of the hopper 2. In the interior of the cover 8 above the cover bottom 27, there can also be provided, as derivable from FIG. 3, a further drive for a valve, which can close the inlet 18. As a matter of principle, thus, the interior of the cover 8 is unhygienically configured so that for this reason, a sealing to the interior of the hopper 2, where the food is located, is necessary. Furthermore, a corresponding sealing important also for the reason that in the hopper interior 2 if appropriate, a vacuum is generated.

For the continuous or intermittent supply of the filling machine 1 with filling medium, a filling level detection is necessary.

For this purpose, the filling machine has a device for the filling level measurement 5. The device for the filling level measurement 5 comprises a radar sensor 6 as well as an analysis unit 14. The radar sensor 6 comprises a not explicitly shown antenna system, via which the electromagnetic waves, in particular short microwave pulses, can be radiated to the filling medium, reflected by the surface 10 and again received by the antenna system. The time from sending to the receipt of the signals is proportional to the distance between sensor and surface 10 and/or, upon known geometry of the hopper 2, to the filling level.

Besides the pulse radar method, with which, as described, due to the time of the pulses from the sender via the object to be reflected to the receiver, the target distance is determined, it is also possible to use an interferometer radar method, whereby by means of an unmodulated high frequency signal, constant frequency distance changes can be measured, whereby the phase of the receiving signal in relation to the sending phase is determined. In principle, also the FMCW radar method (Frequency-Modulated Continuous Wave) may be used. Here, the signal is continuously applied, whereby the frequency is modulated, usually in successive (linear) ramps. From the receiving signal, the distance of the target object can be determined. The TDR (Time Domain Reflectometry) method, as well, may be used and is also subsequently further described in connection with FIG. 6.

As derivable from FIG. 1, a radar sensor 6 is arranged above an upper edge 7 of the hopper 2. Here, the sensor 6 is arranged such that its longitudinal axis A, i.e. here, the antenna axis A (radiation direction) runs perpendicular to a horizontal plane, whereby the horizontal plane comprises the surface of the filling medium 10, or runs parallel thereto, here in any case perpendicular to the middle axis M of the filling machine. The angle β of this embodiment is 90°. The radar sensor 6 is eccentrically arranged, as in the center of the hopper and/or the filling machine, installations are arranged, here for example the shaft 25. The radar sensor 6 here, horizontally seen, is arranged between the feeder curve 22 and the screw 23.

Figure 4:
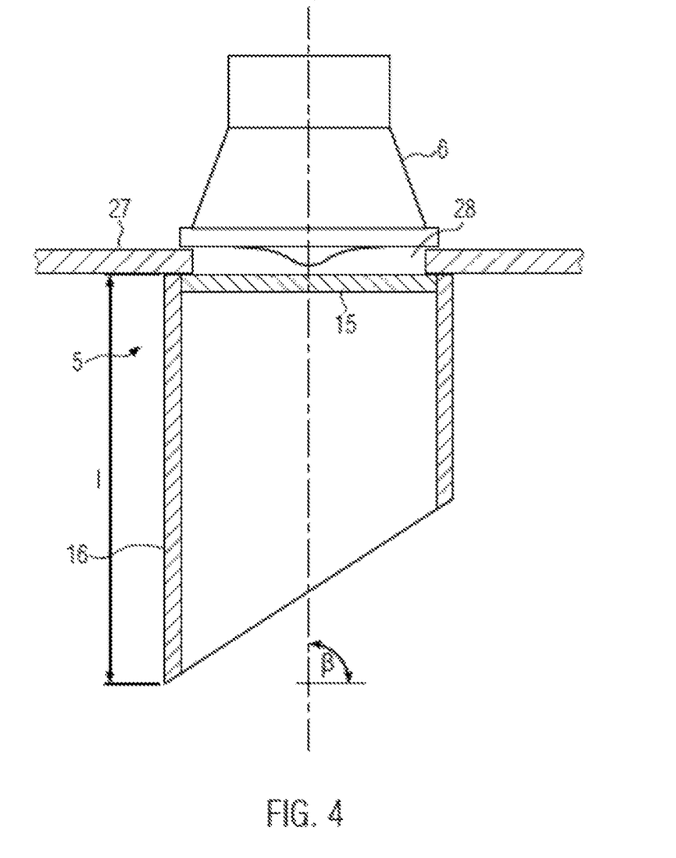
FIG. 4 coarsely shows a schematic longitudinal section through a sensor, which is fixed at a cover bottom according to the present disclosure.

If the cover bottom 27 is made of metal, e.g. stainless steel, an opening 28 in the cover bottom 27 is formed, as in particular derivable from FIG. 4, so that the electromagnetic waves can pass the cover 27. The sensor 6 then is arranged in the area of this opening 28. Alternatively, also the entire cover bottom 27 could be made of a material permeable for the electromagnetic waves, as for example plastic. Then, a separate opening would not be necessary. The radar sensor 6 may be sealed from the hopper interior by a sealing element 15, i.e. sealed vacuum-tight. Therefore, for example a sealing plate, e.g. a plastic plate, in particular an acrylic glass plate, may be provided. The sealing element 15 should be made of a material, which is permeable for electromagnetic radiation. Thus, it is ensured that there is not any connection between the unhygienic inside of the hopper cover 8 and the hopper interior, in which the food is located. However, even if the sensor is not arranged in the sealed cover, but at least protrudes partially the hopper interior, it may be possible to shield it from the hopper interior by means of a sealing element, e.g. a protective cap encompassing the sensor and flushing with hopper or cover wall (not shown) and, thus, protect it against contamination. To the radar sensor 6, in particular at or around the opening 28 or the sealing element 15, a protective tube 16 may be connected, which for example can have a length l in a range of 3 cm to 30 cm and a diameter in a range of 5 cm to 20 cm. If a corresponding protective tube 16 is provided, the sealing element 15 could also be mounted at the tube end and could tightly seal the same. In one example, if the protective tube is beveled at the end facing away from the cover, as thereby, a significant signal echo at the tube end is largely avoided and, thus, incorrect measurements are reduced.

Figure 2:
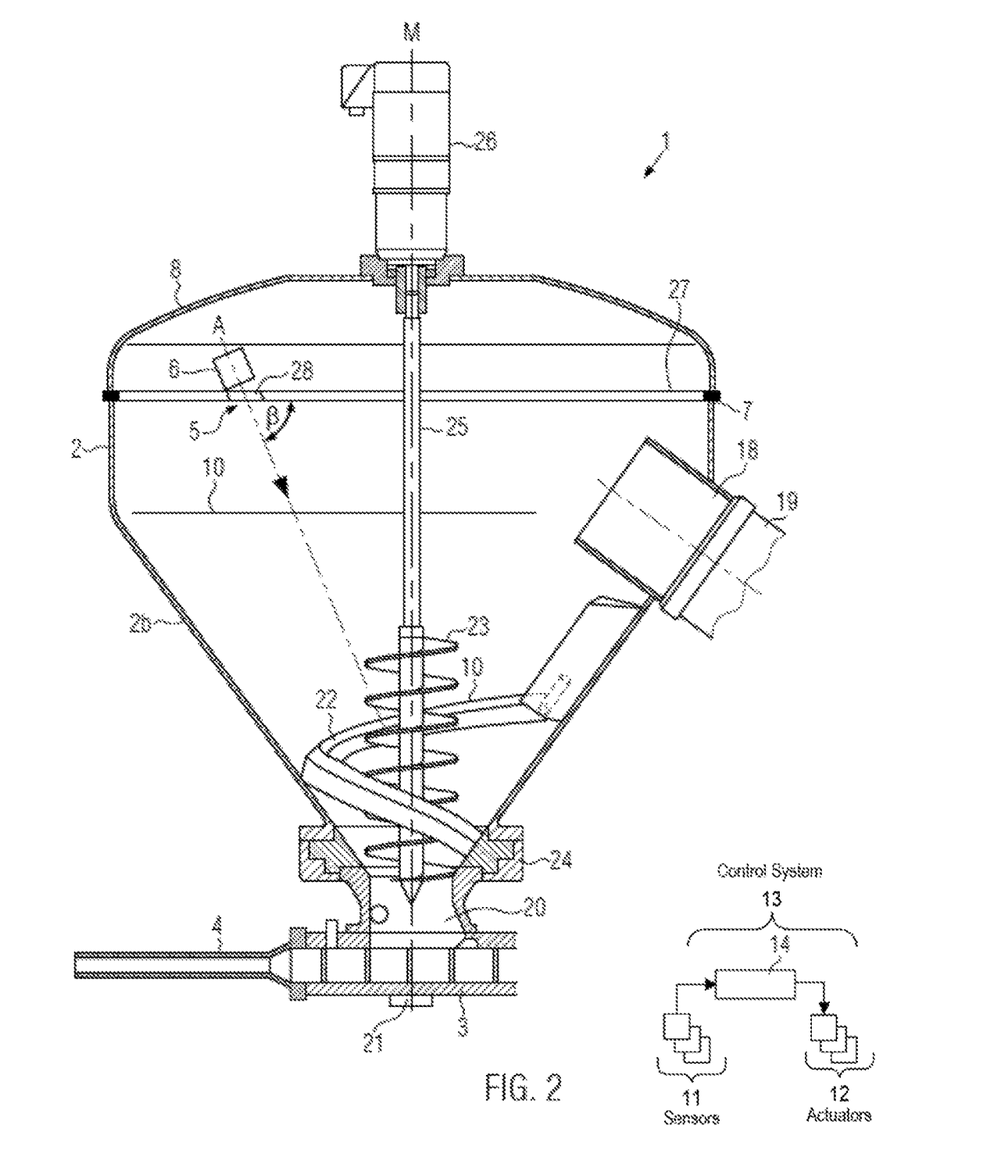
FIG. 2 shows the embodiment shown in FIG. 1 with inclined positioned radar sensor.
Figure 8:
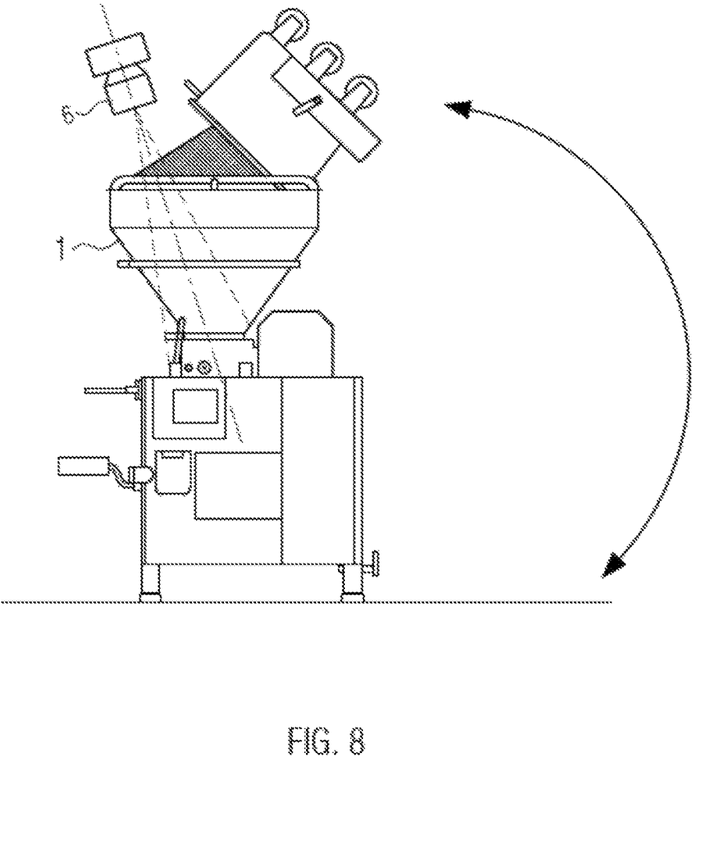
FIG. 8 coarsely shows a schematic filling machine with open hopper according to a further embodiment according to the present disclosure.

As in particular derivable also from FIGS. 2 and 3, the angle β does not necessarily need to be 90°, but the sensor may also be mounted inclined, i.e. that its longitudinal axis A and/or the antenna axis A, i.e. the main beam direction is at an angle of <90°, in some examples <90° to 30° and/or 80° to 40°. An inclined position of the radar sensor and, thus, of the antenna axis allows that even with an eccentric arrangement of the radar sensor and conically tapering hopper, the electromagnetic waves can reach with a high power density up to the lower area of the hopper and that undesired reflections can be minimized. The radar sensor for this purpose is inclined to the direction of the middle axis M. Such an inclined position of the sensor may be in particular regarding open hoppers (i.e. hoppers with an opened upper side) as shown in FIG. 8, as the sensor 6 here needs to be arranged relatively far outside in respect of the middle axis of the hopper 2 in order to avoid a collision with the sausage meat carrier, as the sausage meat carrier during dumping the filling mass protrudes into the central part of the hopper. The sensor 6 here is e.g. externally fixed to the hopper 2 or the machine frame and/or the machine stand via a fixing device (not shown). As in particular derivable from FIGS. 1, 2, and 3, the electromagnetic radiation at the surface 10 of the filling medium is reflected in order to be able to determine the distance to the sensor and/or the filling level. However, the electromagnetic radiation is also reflected at the container walls and the fixed or movable installations, as the feeder curve 22 and the screw 23. The analysis unit 14 may fade out the reflection signals from the hopper wall and/or from components within the hopper, in particular from the movable parts and can exactly identify the filling level.

Figure 5:
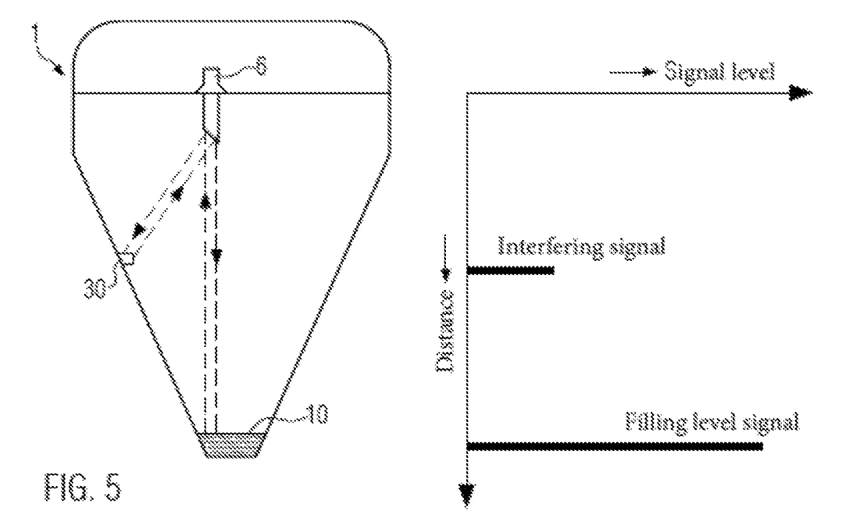
FIG. 5 coarsely shows a schematic hopper of a filling machine according to the present disclosure as well as the signal level depending on the sensor distance.

This is exemplarily described with FIG. 5. FIG. 5 coarsely shows a schematic hopper 2, regarding which the electromagnetic waves hit and are reflected from the sensor 6 to the surface 10 of the filling medium. As derivable from the diagram on the right-hand side, thereby, for this specific distance, a filling level signal arises. With reference numeral 30, the device 30 is exemplarily shown, which is also hit by electromagnetic waves, as the sent electromagnetic waves may have a certain radiation angle. The device 30 reflects, as derivable from FIG. 5, the waves, which result in an interfering signal, however, with lower intensity. As the interfering sources are known, interfering signals having a specifically known distance, or the signal level of which does not correspond to the signal level that had been expected from the filling level signal, can be filtered or faded out. However, it is also possible that e.g. through a machine control of the filling machine, it is determined, when a movable part, e.g. a feeder curve or screw is located in the main beam lobe of the radar sensor, whereby, then, within a corresponding time, the measurement values are faded out or a measurement does not take place.

Figure 7:
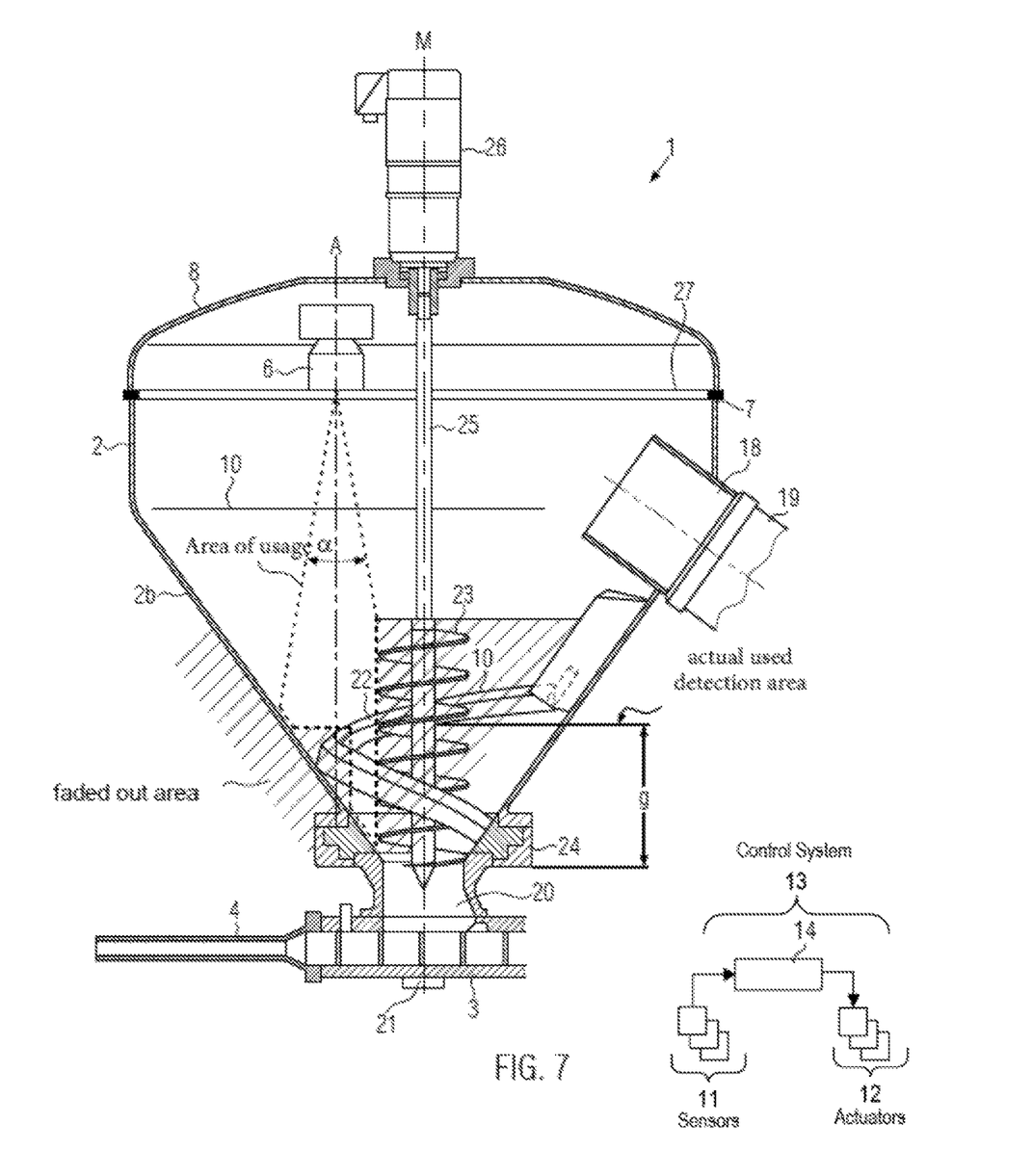
FIG. 7 shows the area of usage and the range faded out of the filling machine shown in FIG. 1 according to the present disclosure.

Regarding existing installations, upon implementation an interfering signal storage may be carried out. As derivable from FIG. 7, the sensor radiates the electromagnetic waves at a radiation angle α so that within the radiation lobe, the possible usage range arises. The faded out range, in which reflected signals are faded out as interfering signals, is displayed as a dashed line. Therefore, the actual dotted measurement range results, in which the measurement signals are trouble-free detectable. It is possible to determine the filling level up to the lowest area, however, according to one embodiment, the filling level is only determined up to a level g, whereby e.g. g >0.2 h (height of the hopper without cover). A measurement in the lowest area, therefore, is unnecessary for some applications, as here, the filling quantity in relation to the volume of the installations, is low.

Figure 6:
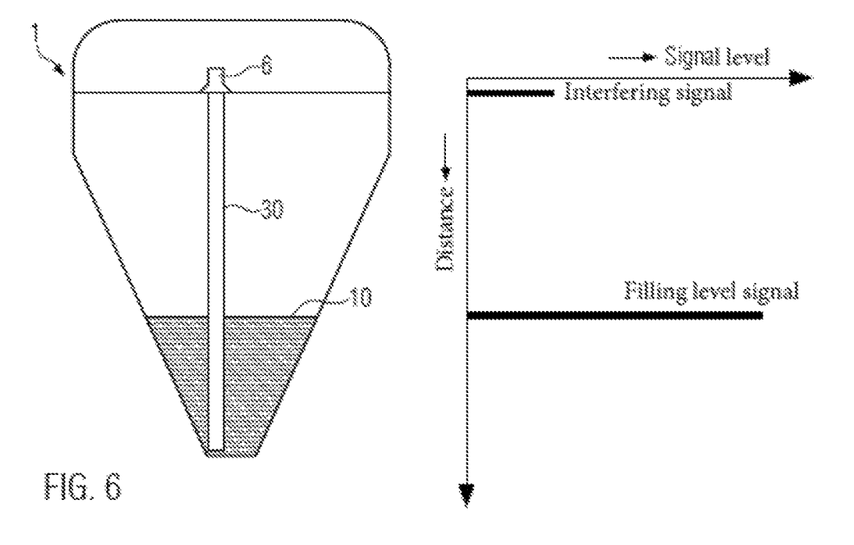
FIG. 6 coarsely shows a schematic longitudinal section through a hopper according to a further embodiment of the present disclosure as well as the signal level depending on the radar sensor distance.

FIG. 6 shows a further embodiment of the present disclosure. This embodiment essentially corresponds to the previous embodiments, whereby here, the spread of the waves does not contactlessly occur, but along a rod or rope 30. Initially, the electromagnetic waves are coupled into the rod or the rope 30 by the radar sensor, whereby, as derivable from FIG. 6, firstly, an interfering signal is generated. As described above, a reflection at the surface 10 of the filling medium occurs such that correspondingly, a filling level signal is generated. The rod and/or the rope may extend up to the lower end of the hopper, i.e. up to the outlet area 20. This system may involve a good focusing, i.e. a small radiation angle, in order to avoid interfering reflections due to tank walls or installations.

Regarding the method according to the present disclosure, in advance, values regarding the hopper geometry, as for example the height h, i.e. the distance of the lower end of the hopper 2 to the sensor 6 may be entered into the analysis unit 14 via a not shown input unit in order to calculate the filling level f (see FIG. 1).

It is further possible according to an embodiment to already in advance enter the distance of specific interfering factors (see FIG. 5) in order to be able to consider these in advance during the calculation of the filling level. Alternatively, corresponding interfering signals may be determined and faded out during the measurement. According to one embodiment, the antenna system of the radar sensor 6 sends short microwave pulses, for example with a power of <10 MW, of a pulse time of <2 ns and with a measurement frequency within the K band (26 GHz technology) to the surface 10 of the filling medium. The analysis unit 14 determines the time from sending to receiving of the filling level signal. The time is proportional to the distance between the sensor and the surface 10, from which the filling level f is calculated. The measurement can occur continuously so that the course of the filling level can be displayed, whereby the analysis unit 14 can be connected to a machine control of the filling machine or may be part of the machine control and whereby the filling level signals may be consulted in order to control or regulate the supply of the filling medium via the inlet 18, in particular through the valve shown in FIG. 3 at the end of the inlet 18.

For example, analysis unit 14 may form a portion of a control system 13. Control system 13 may be a machine control of the filling machine, for example. Control system 13 is shown receiving information from a plurality of sensors 11 and sending control signals to a plurality of actuators 12 (various examples of which are described herein). However, in some examples, the control system 13 may only include one sensor and/or one actuator. As one example, sensors 11 may include radar sensor 6. Radar sensor 6 may correspond to any of the example radar sensors discussed above.

The analysis unit 14 may receive input data from at least one of the sensors 11 (e.g., radar sensor 6), process the input data, and trigger at least one of the actuators 12 in response to the processed input data based on instruction or code programmed therein corresponding to one or more routines.

For example, in embodiments where the actuators 12 may include a display screen, analysis unit 14 may cause a display screen to provide a display of measurement results based on input from radar sensor 6.

In other examples, where actuators 12 may include inlet valve 18, the analysis unit 14 may actuate inlet valve 18 in response to receiving input from sensors 11 to regulate the supply of the filling medium via the inlet valve 18. For example, if analysis unit 14 determines via input from sensors 11 that an amount of filling in the hopper is less than a desired amount, then the analysis unit 14 may increase an opening of inlet valve 18. In other examples, if analysis unit 14 determines via input from sensors 11 that an amount of filling in the hopper is greater than a desired amount, then the analysis unit 14 may decrease an opening of inlet valve 18. Adjusting an opening of inlet valve 18 to increase or decrease the opening may include actuating a drive motor that controls the opening of inlet valve 18, in some examples.

Methods according to the present disclosure may be carried out by control system 13, such as described above, and instructions for methods according to the present disclosure may be stored at analysis unit 14 as executable instructions in non-transitory memory. Instructions for carrying out methods according to the present disclosure may be executed by control system 13 based on instructions stored on a memory of the analysis unit 14 and in conjunction with one or more sensors and actuators, including signals received from sensors 11, such as the sensors described above, and signals sent to actuators. The analysis unit 14 may employ system actuators 12 such as drives for adjusting the opening of valve 18 or actuators for displaying measurements on a display screen, for example.

For example, the control system 13 may carry out a first example method for determining a filling level in a hopper of a filling machine, which may comprise measuring the filling level via a radar sensor, where the filling machine and the radar sensor may be any of the examples as described above. In a second example method, which may optionally include the first example method, during a time in which electromagnetic waves are sent by the radar sensor and reflected by a surface of the filling medium to the radar sensor, the filling level in the hopper may be determined. In a third example method, which may optionally include either or both of the first example method and the second example method, reflection signals of fixed and/or movable parts at which electromagnetic waves are reflected may be faded (e.g., filtered) out.

The methods according to the present disclosure work especially well, if in the hopper 2, there is generated a vacuum in a range of −1 bar to ≤0 bar. The methods according to the present disclosure, however, may also be applied in a range of −1 bar to 3 bar, in particular −1 bar to 2 bar.

The invention claimed is:

1. A filling machine for filling of filling medium for production of sausages having a hopper for accommodating the filling medium, a first conveyer for supplying the filling medium to a filling element, where the filling element is a filling tube, as well as a device for measuring a filling level in the hopper, wherein the device for the filling level measurement comprises a radar sensor, wherein the hopper comprises a cover, whereby the radar sensor and a drive for a second conveyer and/or a drive for an inlet valve are arranged in an area inside the cover, the cover having a bottom sealing the area inside the cover from an interior of the hopper, the radar sensor being positioned completely above the bottom, and wherein the radar sensor is sealed by a sealing element from the interior of the hopper, wherein the radar sensor is accessible via opening the cover.

2. The filling machine according to claim 1, wherein the hopper is, at least in sections, conically tapered downwards and comprises an upper edge, whereby the radar sensor is arranged in an area above the upper edge.

3. The filling machine according to claim 1, wherein the radar sensor is arranged at an opening in the bottom of the cover.

4. The filling machine according to claim 1, wherein the radar sensor is arranged such that its longitudinal axis is oriented perpendicularly to a horizontal plane.

5. The filling machine according to claim 1, wherein the radar sensor is arranged such that its longitudinal axis lies inclined at about an angle of <90° to 30° to a horizontal plane.

6. The filling machine according to claim 1, wherein the radar sensor is arranged such that its longitudinal axis lies inclined at about an angle <90° to 40° to a horizontal plane.

7. The filling machine according to claim 1, wherein the radar sensor is eccentrically arranged.

8. The filling machine according to claim 1, wherein the radar sensor is positioned such that electromagnetic waves sent from the radar sensor in a lower area of the hopper hit at least one of a wall of the hopper, a bottom of the hopper, and a bottom opening of the hopper.

9. The filling machine according to claim 1, wherein the radar sensor is connected to an analysis unit, the analysis unit configured such that during a time that electromagnetic waves are sent and reflected from a surface of the filling medium to the radar sensor, the filling level in the hopper is determined by the analysis unit.

10. The filling machine according to claim 9, wherein the analysis unit fades out reflection signals from at least one of a wall of the hopper and components in the hopper.

11. The filling machine according to claim 10, wherein the analysis unit fades out reflection signals from movable parts in the hopper.

12. The filling machine according to claim 1, wherein the filling machine is a vacuum filling machine.

13. The filling machine according to claim 1, wherein the filling machine is a high vacuum filling machine.

14. The filling machine according to claim 1, wherein the sealing element is a plate permeable for electromagnetic radiation.

15. The filling machine according to claim 1, wherein the radar sensor is arranged at an opening in the bottom of the cover of the hopper, whereby the opening is sealed by the sealing element.

16. The filling machine according to claim 15, wherein the sealing element is a plate permeable for electromagnetic radiation.

17. The filling machine according to claim 1, wherein the filling machine comprises a protective tube connected to the bottom of the cover of the hopper at an opening that is sealed by the sealing element, whereby an end of the protective tube at a leeward side of the cover is beveled.

18. The filling machine according to claim 1, wherein the radar sensor is connected to a rod or a rope, which may protrude into the hopper and, thus, the filling medium and via which a spread of waves occurs.

19. A method for determining a filling level in a hopper of a filling machine, the filling machine for filling of filling medium for production of sausages and the hopper for accommodating the filling medium, where the filling machine has a first conveyer for supplying the filling medium to a filling element, where the filling element is a filling tube, and where the filling machine has a device for measuring the filling level in the hopper, the device for the filling level measurement comprising a radar sensor, and the method comprising measuring the filling level via the radar sensor, wherein the hopper comprises a cover, whereby the radar sensor and at least one a drive for a second conveyer and/or a drive for an inlet valve is arranged in an area inside the cover, the cover having a bottom sealing the area inside the cover from an interior of the hopper, the radar sensor being positioned completely above the bottom, wherein the radar sensor is sealed by a sealing element from the interior of the hopper, and wherein the radar sensor is accessible via opening the cover.

20. The method according to claim 19, wherein during a time of electromagnetic waves sent by the radar sensor and reflected by a surface of the filling medium to the radar sensor, the filling level in the hopper is determined.

21. The method according to claim 19, wherein reflection signals of at least one of fixed and movable parts at which electromagnetic waves are reflected, are faded out.

22. A filling machine for filling of filling medium for production of sausages having a hopper for accommodating the filling medium, a conveyer for supplying the filling medium to a filling element, where the filling element is a filling tube, as well as a device for measuring a filling level in the hopper, wherein the device for the filling level measurement comprises a radar sensor, wherein the hopper comprises a cover, whereby the radar sensor is arranged in an area inside the cover, wherein the radar sensor is sealed by a sealing element from an interior of the hopper, and wherein the filling machine comprises a protective tube connected to the bottom of the cover of the hopper at an opening that is sealed by the sealing element, whereby an end of the protective tube at a leeward side of the cover is beveled.

23. A method for determining a filling level in a hopper of a filling machine, the filling machine for filling of filling medium for production of sausages and the hopper for accommodating the filling medium, where the filling machine has a conveyer for supplying the filling medium to a filling element, where the filling element is a filling tube, and where the filling machine has a device for measuring the filling level in the hopper, the device for the filling level measurement comprising a radar sensor, and the method comprising measuring the filling level via the radar sensor, wherein the hopper comprises a cover, whereby the radar sensor is arranged in an area inside the cover, wherein the radar sensor is sealed by a sealing element from an interior of the hopper, and wherein the filling machine comprises a protective tube connected to the bottom of the cover of the hopper at an opening that is sealed by the sealing element, whereby an end of the protective tube at a leeward side of the cover is beveled.

* * * * *